(12) United States Patent
Arunan et al.

(10) Patent No.: US 8,930,707 B2
(45) Date of Patent: Jan. 6, 2015

(54) NEAR FIELD COMMUNICATION (NFC) DEVICE AND METHOD FOR SELECTIVELY SECURING RECORDS IN A NEAR FIELD COMMUNICATION DATA EXCHANGE FORMAT (NDEF) MESSAGE

(71) Applicant: Samsung Electronics Co., Ltd., Gyeonggi-do (KR)

(72) Inventors: Thenmozhi Arunan, Bangalore (IN); Eun-Tae Won, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/187,965

(22) Filed: Feb. 24, 2014

(65) Prior Publication Data

US 2014/0201534 A1 Jul. 17, 2014

Related U.S. Application Data

(63) Continuation of application No. 12/499,919, filed on Jul. 9, 2009.

(30) Foreign Application Priority Data

Jul. 9, 2008 (IN) ............................ 1668/CHE/2008
May 19, 2009 (KR) ......................... 10-2009-0043472

(51) Int. Cl.
*H04L 9/32* (2006.01)
*G06K 7/10* (2006.01)
*H04W 12/10* (2009.01)
*H04B 5/00* (2006.01)
*H04W 4/00* (2009.01)

(52) U.S. Cl.
CPC ......... *H04L 9/3247* (2013.01); *H04L 2209/805* (2013.01); *H04B 5/00* (2013.01); *G06K 7/10297* (2013.01); *H04W 4/008* (2013.01); *H04L 9/3281* (2013.01); *H04W 12/10* (2013.01); *H04L 2209/68* (2013.01)
USPC .......................................... 713/176; 455/41.1

(58) Field of Classification Search
None
See application file for complete search history.

(56) References Cited

U.S. PATENT DOCUMENTS 5,799,082 A  8/1998  Murphy et al.
5,933,498 A  8/1999  Schneck et al.
(Continued)

FOREIGN PATENT DOCUMENTS

JP  10105449 A  *  4/1998
JP  2011-523749   8/2011
(Continued)

OTHER PUBLICATIONS

NFC Forum, Signature Type Definition, Jun. 10, 2008, Version 0.99, pp. 1-18.*

(Continued)

*Primary Examiner* — Michael Chao
*Assistant Examiner* — Jason Plotkin
(74) *Attorney, Agent, or Firm* — The Farrell Law Firm, P.C.

(57) ABSTRACT

A method and apparatus for selectively securing records in a Near Field Communication Data Exchange Format (NDEF) message in a Near Field Communication (NFC) device are provided. The method includes generating a place marker signature record by setting a URI_present field to '0' and setting a signature_type field to a predefined value, wherein a combination of the URI_present field set to '0' and the signature_type field set to the predefined value indicates that a signature Record Type Definition (RTD) is a place marker signature record; and placing the place marker signature record in the NDEF message, wherein a set of records following the place marker signature record are secured.

18 Claims, 7 Drawing Sheets

(56) References Cited

U.S. PATENT DOCUMENTS

| | | | |
|---|---|---|---|
| 6,016,491 A | 1/2000 | Kou | |
| 6,463,537 B1 | 10/2002 | Tello | |
| 7,058,663 B2* | 6/2006 | Johnston et al. | 1/1 |
| 7,814,328 B1 | 10/2010 | Leonard et al. | |
| 8,060,747 B1* | 11/2011 | Leonard et al. | 713/176 |
| 2003/0231767 A1 | 12/2003 | Carbajal | |
| 2004/0006486 A1 | 1/2004 | Schmidt et al. | |
| 2004/0139336 A1* | 7/2004 | McLean et al. | 713/189 |
| 2004/0172555 A1 | 9/2004 | Beringer et al. | |
| 2004/0243852 A1 | 12/2004 | Rosenstein | |
| 2005/0007964 A1 | 1/2005 | Falco et al. | |
| 2005/0188203 A1 | 8/2005 | Bhaskaran et al. | |
| 2005/0235163 A1 | 10/2005 | Forlenza et al. | |
| 2005/0246540 A1 | 11/2005 | Brown | |
| 2006/0210071 A1* | 9/2006 | Chandran et al. | 380/42 |
| 2006/0233180 A1 | 10/2006 | Serghi et al. | |
| 2007/0038854 A1 | 2/2007 | Cheon et al. | |
| 2008/0065877 A1 | 3/2008 | Son et al. | |
| 2008/0235258 A1 | 9/2008 | Chung et al. | |
| 2008/0289039 A1 | 11/2008 | Rits et al. | |
| 2009/0055643 A1 | 2/2009 | Brown et al. | |
| 2009/0070853 A1 | 3/2009 | Chung et al. | |
| 2009/0100267 A1 | 4/2009 | Brown et al. | |
| 2009/0119407 A1* | 5/2009 | Krishnan | 709/228 |
| 2009/0178118 A1 | 7/2009 | Cedo Perpinya et al. | |
| 2009/0214034 A1 | 8/2009 | Mehrotra et al. | |
| 2009/0303019 A1 | 12/2009 | Trappeniers et al. | |
| 2010/0268952 A1 | 10/2010 | Chung et al. | |

FOREIGN PATENT DOCUMENTS

| | | |
|---|---|---|
| KR | 1020060060189 | 6/2006 |
| KR | 1020060067407 | 6/2006 |
| KR | 100770914 | 10/2007 |
| WO | WO 2008/078216 | 7/2008 |

OTHER PUBLICATIONS

NFC Forum, Signature Record Type Definition, Apr. 16, 2013, Version 2.0, pp. 1-25.*

NFC Forum, Signature Record Type Definition, Technical Specification, Signature 1.0, NFCForum-TS-Signature_RTD-1.0, Nov. 18, 2010.

NFC Forum, Signature Record Type Definition, Technical Specification, RTD-Signature 0.99, NFCForum-TS-RTD_Signature_0.99, Jun. 10, 2008.

NFC Forum, NFC Data Exchange Format (NDEF), Technical Specification, NFCForum-TS-NDEF_1.0, Jul. 24, 2006.

NFC Forum, NFC Record Type Definition (RTD), Technical Specification, NFCForum-TS-RTD_1.0, Jul. 24, 2006.

Markus Kilas, Digital Signature on NFC Tags, Mar. 18, 2009, Master of Science Thesis, pp. 1-53.

Lawrence et al., WS-SecurityPolicy 1.2, Jul. 2007, pp. 18, 19, 61, 87, 91.

* cited by examiner

| R1 | R2 | Begin/Place Holder Sig RTD | R3 | R4 | R5 | Sig RTD | R6 |

FIG.7

| New Signature Record-Format 2 | | | |
|---|---|---|---|
| Version | Secured Bytes | Signature | Certificate Chain |

| R1 | R2 | R3 | R4 | R5 | Sig RTD with Secured bytes field set to sizeof(R4+R5) | R6 |

FIG.9

| Signature Field | |
|---|---|
| 0 | 0x00 |

FIG.10

NEAR FIELD COMMUNICATION (NFC) DEVICE AND METHOD FOR SELECTIVELY SECURING RECORDS IN A NEAR FIELD COMMUNICATION DATA EXCHANGE FORMAT (NDEF) MESSAGE

PRIORITY

This application is a Continuation of U.S. patent application Ser. No. 12/499,919, which was filed in the U.S. Patent and Trademark Office on Jul. 9, 2009, and claims priority under 35 U.S.C. §119(a) to an application filed in the Intellectual Property Office of India on Jul. 9, 2008, and assigned application Serial No. 1668/CHE/2008, and to an application filed in the Korean Industrial Property Office on May 19, 2009, and assigned Serial No. 10-2009-0043472, the entire contents each of which are incorporated herein by reference.

BACKGROUND OF THE INVENTION

1. Field of the Invention

The present invention relates generally to Near Field Communication (NFC) technology, and more particularly, to methods of identifying records that are to be secured in an NFC security Record Type Definition (RTD).

2. Description of the Related Art

NFC technology is currently being used with various handheld devices such as mobile terminals, mainly for sharing information, payment, and ticketing and travel. Accordingly, information related to these services can be exchanged over NFC using predefined NFC tags as per the NFC RTD.

The Security Work Group (WG) in the NFC Forum™ has defined a record type called the Signature RTD that can be included as a record in a Near Field Communication Data Exchange Format (NDEF) message. The signature RTD provides a way to verify the authenticity and integrity of some, or all, of the records in an NDEF message. The Signature RTD contains a digital signature that can be verified using pre-established credentials such as certificates.

A wide range of applications can be supported over an NFC link. Typically, modes of operation of NFC devices can be classified as Reader/Writer mode, Peer-to-Peer mode, and Card Emulation mode. In the Peer-to-Peer mode of communication both NFC devices can have similar capabilities and there is no distinction between the devices. In Reader/Writer mode of communication, one of the devices has the capability of the Reader/Writer and the other device stores a simple tag. In the Card Emulation mode of communication, one of the devices is a reader and the other device could be a tag or an NFC device that stores the details of a smart card or a credit card.

Data used in NFC communication can be stored is several formats. A NDEF message is a collection of one or more individual records that can have specific definitions called Record Type Definitions (RTDs). The NFC Forum™ defines several well-known RTDs. For some typical applications of NFC, like Smart Poster, Handover of Configuration information, Web Access, etc., RTDs are defined by the NFC Standards body and published as recommendations. These RTDs can be used individually or as a part of an NDEF message. The record includes a few header fields that list the control information for the record, for example, type, payload length, and an optional ID field. The data specific to the application are stored in payload field of the record. The details of the NDEF message format are provided in the NFC Data Exchange Format (NDEF), Technical Specification—NFC Forum™ NDEF 1.0 NFCForum-TS-NDEF_1.0-2006 Jul. 24.

Some of the typical applications of NFC are Smart Posters, e-ticketing, coupons, loyalty points, and Peer-to-Peer applications like vcard exchange, image transfer, and the like.

For the above-mentioned applications, application data can be formatted in a single record or in multiple records.

An NDEF message is a collection of individual records following some predefined RTD. Data in the NDEF record can be secured for integrity protection and to authenticate the creator of the record by adding NFC Signature RTD records. The Signature RTD creator uses algorithms to create a digital signature field that provides integrity protection. Keys that are used to generate a digital signature for a message are provided in certificates that are also listed in the Signature RTD.

The NFC Forum™ document that explains the specification for the Signature RTD, which will be referred to herein, is NFC Forum-TS-RTD_Signature_0.99-Technical Specification NFC Forum™ RTD-Signature 0.99-NFC Forum-TS-RTD_Signature_0.99-2008 Jun. 10, DRAFT.

One or more Signature RTD records can be added to an NDEF message to provide security features such as integrity and authentication for one or more records in the NDEF message. In the Signature RTD specification there is a need to explicitly identify the records for which the signature field in the Signature RTD provides security. The Signature RTD specification, before version 0.99, defines that a given Signature RTD record can provide security to all the records preceding this Signature RTD record or it can protect the records that are between a previous Signature RTD in the same NDEF message and the present Signature RTD record.

However, the above referenced definitions for specifying the records that are secured by a Signature RTD record are not flexible enough as it is not possible to exclude some records in the beginning of an NDEF message that do not need to be secured. That is, there is no method to identify a block of records in an NDEF message that are secured by a Signature RTD.

SUMMARY OF THE INVENTION

The present invention has been designed to address at least the above-identified problems in the prior art, and to provide at least the advantages described herein below. Accordingly, the present invention provides methods for identifying records or a sequence of bytes, in an NDEF record, that are to be secured in a Signature RTD record.

In accordance with an aspect of the present invention, a method for selectively securing records in a Near Field Communication Data Exchange Format (NDEF) message in a Near Field Communication (NFC) device is provided. The method includes generating a place marker signature record by setting a URI_present field to '0' and setting a signature_type field to a predefined value, wherein a combination of the URI_present field set to '0' and the signature_type field set to the predefined value indicates that a signature Record Type Definition (RTD) is a place marker signature record; and placing the place marker signature record in the NDEF message, wherein a set of records following the place marker signature record are secured.

In accordance with another aspect of the present invention, a Near Field Communication (NFC) device for selectively securing records in a Near Field Communication Data Exchange Format (NDEF) message is provided. The NFC device includes an NFC message generating unit for generating a place marker signature record by setting a URI_present field to '0' and setting a signature_type field to a predefined value, wherein a combination of the URI_present field set to '0' and the signature_type field set to the predefined value indicates that a signature Record Type Definition (RTD) is a place marker signature record, and placing the place marker signature record in the NDEF message, wherein a set of records following the place marker signature record are secured; and a transmitter for transmitting the NDEF message.

BRIEF DESCRIPTION OF THE DRAWINGS

The above and other aspects, features, and advantages of the present invention will become more apparent to one skilled in the art from the following detailed description when taken in conjunction with the accompanying drawings, in which:

FIG. 7 illustrates a first method of selecting records that are secured in an NDEF in accordance with an embodiment of the present invention;

FIG. 8 illustrates an alternative structure for a signature RTD in accordance with an embodiment of the present invention;

FIG. 9 illustrates a second method of securing records in an NDEF in accordance with an embodiment of the present invention;

FIG. 10 illustrates sub fields of a signature field in accordance with an embodiment of the present invention;

Figure 1:
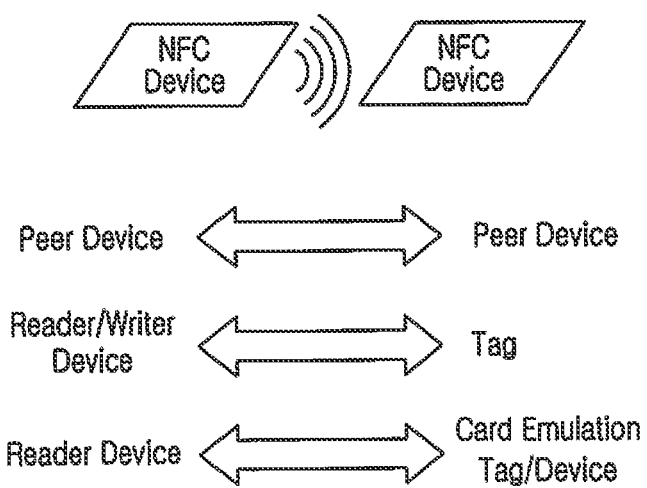
FIG. 1 illustrates communication between a pair of NFC devices.

Persons skilled in the art will appreciate that elements in the figures are illustrated for simplicity and clarity and may have not been drawn to scale. For example, the dimensions of some of the elements in the figures may be exaggerated relative to other elements to help to improve understanding of various embodiments of the present invention.

DETAIL DESCRIPTION OF EMBODIMENTS OF THE INVENTION

Hereinafter, embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may obscure the subject matter of the present invention.

Additionally, it may be observed that the method steps and system components have been represented by conventional symbols in the figures, showing only specific details that are relevant for an understanding of the present invention. Further, details that may be readily apparent to person ordinarily skilled in the art may not have been disclosed. In this document, relational terms such as first and second, and the like, may be used to distinguish one entity from another entity, without necessarily implying any actual relationship or order between such entities.

As indicated above, the present application provides methods for identifying records preserved in NDEF (NFC Data Exchange Format). In accordance with one embodiment of the present invention, the beginning of a set of records that are secured by a signature RTD is indicated using a Begin/Place Marker signature record. In accordance with a second embodiment of the present invention, a new field is added to the signature RTD record called the secured bytes. The secured bytes field is used to identify bytes of data that are to be protected by the Signature RTD. This application has the potential to protect the data from multiple records and multiple NDEF messages using a single Signature RTD, by using the secured bytes field.

FIG. 1 illustrates communication between a pair of NFC devices. Generally, the devices communicate in three different application modes, i.e., a Peer-to-Peer mode, a Reader/Writer mode, and a Card Emulation mode. In the Peer-to-Peer mode, both the NFC devices can have similar capability and there is no distinction between the devices. In the Reader/Writer mode, one of the devices has the capability of the Reader/Writer and the other device is a simple tag. In the Card Emulation mode, one of the devices is a Reader and the other device could be a simple tag or a NFC device that stores the details of a credit card in the form of a record stored in secure memory.

Figure 2:
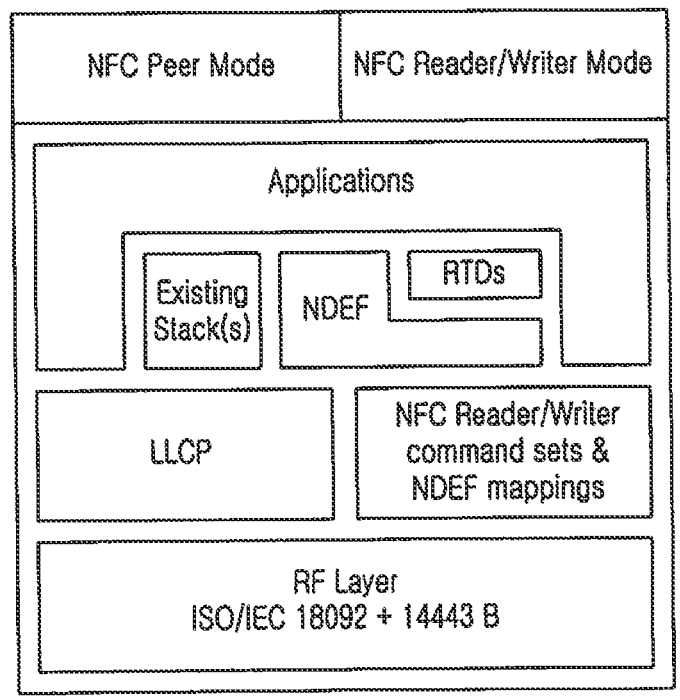
FIG. 2 illustrates a conventional protocol stack required to support NFC technology.

FIG. 2 illustrates a conventional protocol stack that is used to support NFC technology in an NFC device. The application data can be coded in the form of NDEF messages by a message generator of the NFC device and transported over the NFC link by a transmitter of the NFC device. The NDEF format can be used in the Peer-to-Peer mode as well as the Reader/Writer mode of operation.

Figure 3:
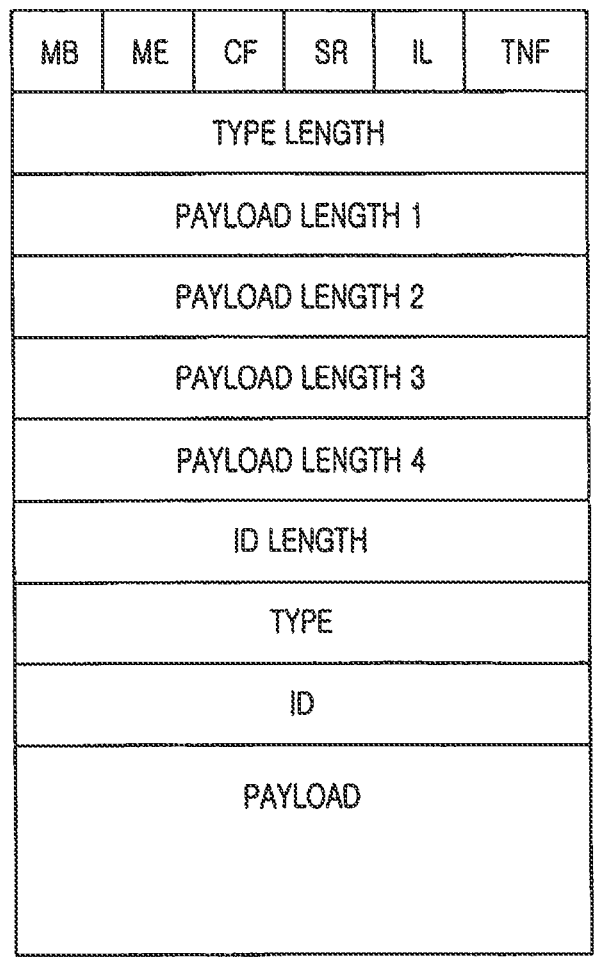
FIG. 3 illustrates an NDEF structure.

FIG. 3 illustrates the NDEF structure. The first byte includes control information for the NDEF message in various bit fields, i.e., MB (Message Begin), ME (Message End), CF (Chunk Flag), SR (Short Record), IL (ID Length) field, and TNF (Type Name Format). Various length and values for the Type, ID and Payload are stored after the various bit fields.

Figure 4A:
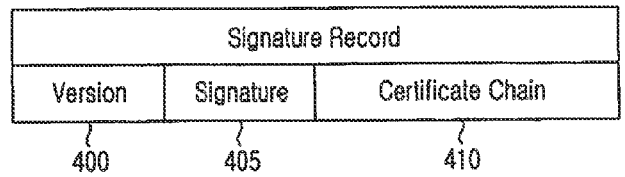
FIG. 4A illustrates a payload of a Signature RTD record.

FIG. 4A illustrates a conventional payload of the existing Signature RTD record, as described in NFC Forum-TS-RTD_Signature_0.99. Referring to FIG. 4, a Version field 400 lists the major and minor version number of the specification standard. A Signature field 405 includes a TLV structure to represent the signature for the NDEF data that is protected. A Certificate Chain field 410 provides the list of certificates that are used to authenticate the sender of the NDEF message.

Figure 4B:
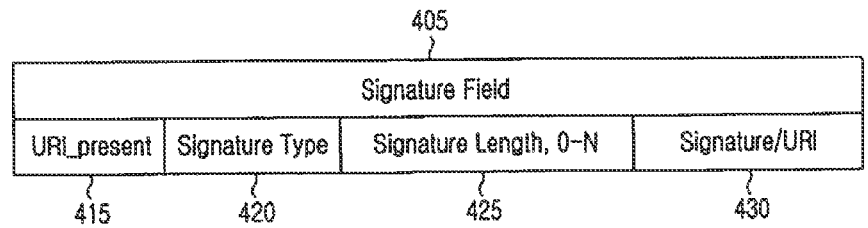
FIG. 4B illustrates fields in a Signature field of a Signature RTD.

FIG. 4B illustrates the sub fields in the Signature field 405 of the Signature RTD illustrated in FIG. 4A. More specifically, the Signature field 405 includes a Uniform Resource Identifier (URI)_present bit field 415, a Signature Type field 420, a Signature length field 425, and a Signature/URI field 430. The URI_present bit field 415 is used to indicate if the signature is included in the record itself or is present in a URI pointed to by the Signature/URI field 430.

Figure 5:
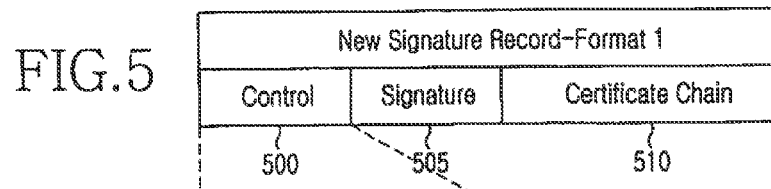
FIGS. 5 and 6 illustrate a modified structure of a Signature RTD record in accordance with an embodiment of the present invention.
Figure 6:
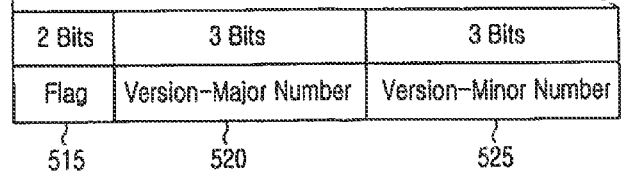

FIGS. 5 and 6 illustrate a modified Signature RTD record in accordance with an embodiment of the present invention.

Referring to FIG. 5, a first byte of the modified Signature RTD record is a control field 500, which includes three sub-fields (515, 520, and 525) as illustrated in FIG. 6.

Referring to FIG. 6, the first two bits of the control field 500, i.e., the Flag field 515, indicate whether the signature RTD record is used to indicate the beginning of a record block for which integrity, authentication protection is given or whether the record also includes a Signature field 505. The following two fields, i.e., the Version-Major Number field 520 and the Version-Minor Number field 525, mark the major and minor version numbers as 3 bit fields, respectively. The first two bits of the control field 500 can take one of the following values.

00—Marks a beginning of a record block for which signature is later added. This is a Place Marker Signature Record.

11—Indicates a signature record including a signature

01—10 are reserved for future use.

FIG. 7 illustrates a first method of selecting records that are secured in an NDEF in accordance with an embodiment of the present invention. Referring to FIG. 7, the record named as Begin/Place Holder Sig RTD is coded and indicates to the NDEF parser that the records following this Signature RTD, until a next signature RTD, are secured. Accordingly, records R3, R4, and R5 are protected by the Signature RTD that follows record R2.

FIG. 8 illustrates an alternative structure for a Signature RTD in accordance with an embodiment of the present invention. More specifically, FIG. 8 represents an alternative structure for a Signature RTD where data that is secured by this Signature RTD is indicated using bytes of information.

Referring to FIG. 8, a Secured Bytes field 805 indicates a number of data bytes that precedes this field of the Signature RTD, which is secured by a signature in this Signature RTD.

FIG. 9 illustrates a second method of securing records in an NDEF in accordance with an embodiment of the present invention. Referring to FIG. 9, the Secured Bytes field is set to a value equal to the size of the records R4 and R5 in the Sig RTD field.

FIG. 10 illustrates sub fields of a signature field in accordance with an embodiment of the present invention. More specifically, in FIG. 10, a Begin or Place Marker record has the URI Present and Signature Type field set to zero. The Signature Type field can take index values defined in a table that lists the valid values that can used to give information about the signature algorithm used to generate the digital signature. For example, a Signature type 0x00 can be used to indicate a Place marker record.

Figure 11:
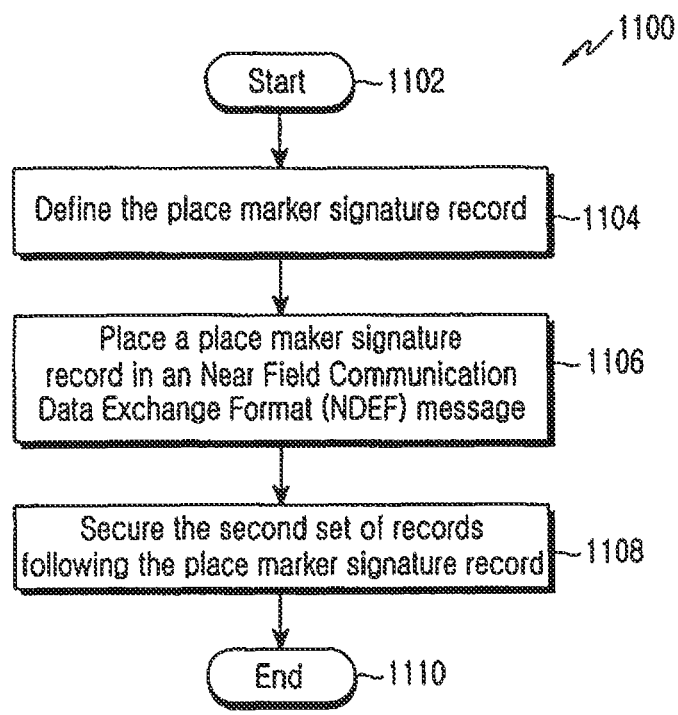
FIG. 11 is a flowchart illustrating a method for selectively securing records in an NDEF, in accordance with an embodiment of the present invention.

FIG. 11 is a flowchart illustrating a method for selectively securing records in a Near Field Communication Data Exchange Format (NDEF), in accordance with an embodiment of the present invention. More specifically, FIG. 11 illustrates a method 1100 for selectively securing records in an NDEF.

Referring to FIG. 11, at step 1102, the method 1100 is initiated. At step 1104, a place marker signature record is defined. The place marker signature record can be defined by setting a URI_present field to '0' and setting a signature_length field to '0'. The combination of URI_present field set to '0' and signature_length field set to '0' indicates the signature record is a place marker signature record. The place marker signature record can also be defined by dividing a version field in the Signature RTD into a flag, a major number version, and a minor number version. The flag field is used to indicate if the record is a place marker signature record or a Signature RTD. In addition, the place marker signature record can be defined by setting a URI_present field to '0' and setting a Signature_Type field to a predefined value. The combination of URI_present field set to '0' and Signature_Type field set to the predefined value indicates the signature record is a place marker signature record.

At step 1106, a place marker signature record is placed in the NDEF message. The place marker signature record is a modified signature RTD. A first set of records preceding the place marker signature record in the NDEF is unsecured. In accordance with an embodiment of the present invention, the first set of records preceding the place marker signature record until a beginning of the NDEF message are unsecured In accordance with another embodiment of the present invention, the first set of records preceding the place marker signature record until the signature RTD preceding the place marker signature record are unsecured.

At step 1108, the second set of records following the place marker signature record is secured. The method 1100 gives flexibility to secure some records while keeping some records the same NDEF unsecured. Thereafter, the method 1100 terminates at step 1110.

The above-described method provides flexibility to delete unsecured records in the NDEF message without changing the signature in the signature RTD. In addition, unsecured records in the NDEF message can be modified without changing the signature in the signature RTD. Further unsecured records in the NDEF message can be added without changing the signature in the signature RTD. The method 1100 is explained below in detail under the heading Method 1.

Method 1:

To mark the beginning of a set of records that are secured by a Signature RTD, a Begin/Place Marker signature record is added before the first record that is to be secured. Three different field representations can be used define a Begin/Place Marker signature record.

(i) Defining a Begin/Place Marker Signature Record Using a Control Field

The Signature RTD record is modified to include a two bit flag field. This 2 bit field can be coded in the first byte of the current Signature RTD record. The values that can be taken by this 2 bit flag field are:

00—Marks beginning of record block for which signature is later added. This is a Place Marker Signature Record.

11—Signature record with signature

01—10 are reserved for future use

FIGS. 5, 6, and 7 provide examples for the structures that may be used in Method 1.

To mark the beginning of a set of records that are secured by a Signature RTD, a Begin/Place Marker signature record is added before the first record that is to be secured with the control field 500 in the Signature RTD set to 00. The signature field 505 can be absent in this record, as this is just a place marker record. The Certificate Chain field 510 can be optionally specified in this place marker record itself. By placing the Certificate Chain field 510 in the place marker record, the security engine in the NDEF parser at the receiver can authenticate the message even before the signature needs to be calculated. Another advantage is that the signature generation can happen as the NDEF message is read. This can give added performance improvement.

A signature RTD with the flag bits set to '11' is placed after the set of records that are to be secured. This Signature RTD has the signature that will be verified at the receiver for integrity protection. If the certificate values are not specified in the Place Marker signature record then it is provided in the later Signature RTD that has the signature field set.

(ii) Defining a Begin/Place Marker Signature Record Using First Byte of Signature Field An alternate way to represent a Begin/Place Marker record is to use subfields 415, 420, 425, and 430 of the Signature field of the Signature RTD. The version field 400 is used only to indicate the version. The sub fields 415, 420, 425, and 430 of the Signature field are illustrated FIG. 4B. For example, two combinations of the Signature sub fields can be used to represent the place marker record.

1. The first byte of the Signature field can be set to 0. This means that the first bit, URI_present field 415 is set to 0 and the Signature Type field 420 is set to a predefined value, e.g., 0. This indicates that this Signature record does not have a valid signature, but is used only as a place marker to identify records that are to be signed or left unsecured. In this format, the Signature Length field 425 and the Signature/URI field 430 follow the Signature Type field 420. Referring to FIG. 10, Signature Length field 425, and Signature/URI field 430 are not present in the Signature RTD.

2. The first bit, URI_present 415 is set to 0, and the Signature Length field 425 is set to 0 (See FIG. 4B). The Signature Type field 420 indicates the digital signature algorithm type that is used to generate the signature. The Certificate Chain field 410 can be optionally present. By providing the signature type and certificate information in the place marker record the security engine in the NDEF parser at the receiver can authenticate the message even before the signature is to be calculated. Another advantage is that, for verification purposes, the signature generation can happen as the NDEF message is read, giving added performance improvement.

A Signature RTD with the Signature Type set to denote the signature algorithm used along with the digital signature is placed after the set of records that are to be secured. This Signature RTD includes the digital signature that is to be verified at the receiver for integrity protection, of the set of records. If the certificate values are not specified in the Place Marker signature record then it is included in the later Signature RTD that has the signature field set.

Using one of the above two methods it is possible to represent Place Marker/Begin Signature RTD records. The payload of the Place Marker Signature RTD records is only a few bytes long, accordingly they can be set as Short Records (e.g., set SR=1 in NDEF header, as in FIG. 3) as defined in the NDEF specification.

The records before the Begin/Place Marker signature record up to the start of the NDEF message or up to another signature RTD record are not secured. This is an additional advantage given to the application by which some large records or records containing public information may not be secured using the digital signature. For example, in FIG. 7, records R1 and R2 are not protected by the digital signature, records R3, R4, and R5 are protected by the signature.

Figure 12:
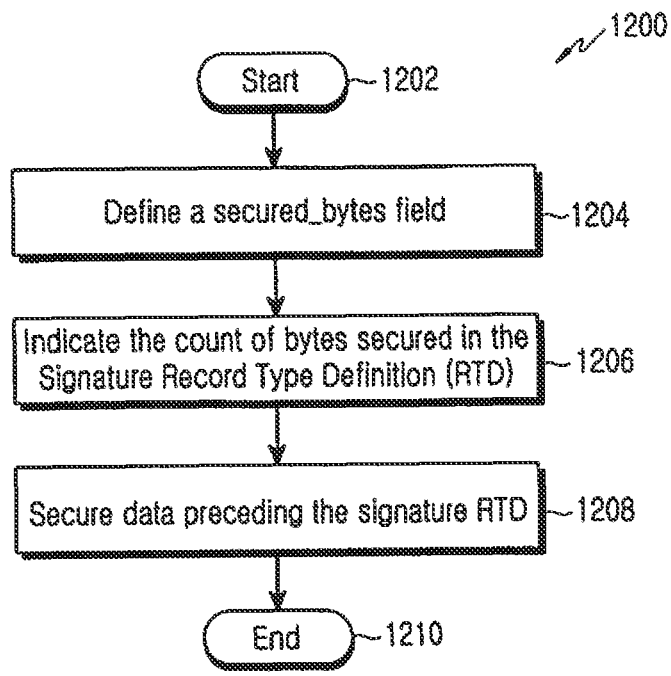
FIG. 12 is a flowchart illustrating a method for selectively securing records in an NDEF, in accordance with another embodiment of the present invention.

FIG. 12 is a flowchart illustrating a method for selectively securing records in an NDEF, in accordance with another embodiment of the present invention. In FIG. 12, a method 1200 for selectively securing records in an NDEF is illustrated.

Referring to FIG. 12, at step 1202, the method 1200 is initiated. At step 1204, a secured_bytes field is defined, which is used to identify the data that is secured by this Signature RTD. At step 1206, the secured_bytes field is set to the count of bytes of information that is secured in the Signature RTD, and the digital signature that secures the data is added in the Signature RTD. The certificate chain that provides the authentication is also added in the Signature RTD. The secured_bytes field indicates a number of bytes to be secured preceding the Signature RTD. At step 1208, data preceding the secured bytes field of the Signature RTD are secured, based on the value of the secured bytes field. Thereafter, the method 1200 terminates at step 1210. The method 1200 will be explained below in more detail under the heading Method 2.

Method 2:

Referring to FIGS. 8 and 9, a new field, i.e., Secured Bytes field 805, is added to the Signature RTD record. A version field 800 in this format can just have the major and minor version numbers of the specification that is used. The Secured Bytes field 805 is an integer value that indicates the number of data bytes preceding this field that are secured by this Signature RTD. This can indicate only data in the current NDEF message. Alternatively, the secured bytes can also include the data in NDEF records that are outside the current NDEF message. This is an added advantage of using this method. The NDEF parser reads the Secured Bytes field 805 and applies the signature algorithm to that many bytes of data that precede this field in the signature record. The header fields of the Signature RTD record are also included in the Secured Bytes.

For example, the NDEF message in accordance with an embodiment of the present invention may be used to depict a Smart Poster. A Smart Poster can typically have several records of Text type, or MIME type that includes audio, video data, URI, etc. The NDEF message illustrated in FIG. 7 can be a Smart Poster record with record R1 being a record with audio data, and R2 being a record with data of an image. The creator of this Smart Poster can choose not to sign the records R1 and R2 for couple of reasons. Firstly, these audio and image records can be large records so calculating the signature for them can be time consuming. Secondly, if these are not signed even simple devices that do not have the certificates installed on them can get the information in records R1 and R2. Records R3, R4, and R5 may be URI type, Text giving pricing information that are provided by an entity that needs to be authenticated. Accordingly, using Method 1 described above, the beginning of this block is marked by a Begin/Place Marker Sig RTD record that is placed before record R3 and after the end of the record block that is record R5, a Signature RTD with the signature field is placed. The NDEF parser can then appropriately use the information in this Smart Poster, where records R1 and R2 are not secured and are not used during the signature generation, and where contents of records R3, R4 and R5 are secured using the signature field present in the Signature RTD following record R5.

Figure 13:
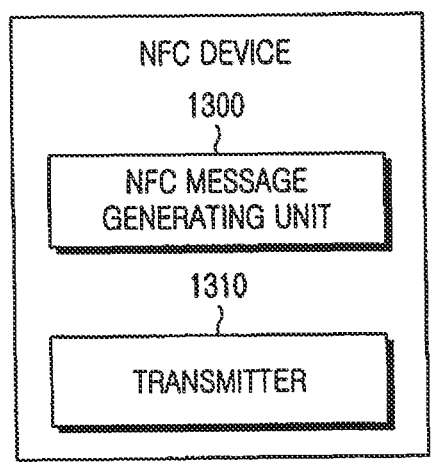
FIG. 13 illustrates an NFC Device according to an embodiment of the present invention.

FIG. 13 illustrates an NFC Device according to an embodiment of the present invention.

Referring to FIG. 13, an NFC message generating unit 1300 generates an NDEF message in an NDEF format, and a transmitter 1310 transmits the generated NDEF message.

More specifically, in accordance with the method illustrated in FIG. 11, the NFC message generating unit 1300 places a place marker signature record in the NDEF message. The place marker signature record is a modified signature Record Type Definition (RTD), and a first set of records preceding the place marker signature record placed in the NDEF are unsecured. The NFC message generating unit 1300 secures second set of records following the place marker signature record using a signature RTD including a valid signature. Thereafter, the transmitter 1310 transmits the generated NDEF message.

In accordance with the method illustrated in FIG. 12, the NFC message generating unit 1300 sets a secured_bytes field in a signature Record Type Definition (RTD). The secured_bytes field indicates a number of bytes of data secured by a signature in the signature RTD. The NFC message generating unit 1300 then secures data in the NDEF message preceding the secured_bytes field in the signature RTD, based on a value of the secured bytes field. Thereafter, the transmitter 1310 transmits the generated NDEF message.

While various embodiments of the present invention have been illustrated and described, it will be clear that the present invention and its advantages are not limited to only these embodiments. Numerous modifications, changes, variations, substitutions and equivalents will be apparent to those skilled in the art without departing from the spirit and scope of the present invention as described in the claims. Accordingly, the specification and figures are to be regarded as illustrative examples of the invention, rather than in restrictive sense.

What is claimed is:

1. A method for selectively securing records in a Near Field Communication Data Exchange Format (NDEF) message in a Near Field Communication (NFC) device, the method comprising:
generating a place marker signature record indicating that a first set of records preceding the place marker signature record in the NDEF message is unsecured and a second set of records following the place marker signature record is secured, the place marker signature record being generated in a form of a signature Record Type Definition (RID) by setting a URI_present field of the signature RTD to '0' and setting a signature_type field of the signature RTD to a predefined value, wherein a combination of the URI_present field set to '0' and the signature_type field set to the predefined value indicates that the signature RTD is a place marker signature record; and
placing the place marker signature record in the NDEF message.

2. The method of claim 1, wherein the NDEF message includes an unsecured first set of records spanning from a beginning of the NDEF message to the place marker signature record.

3. The method of claim 1, wherein the NDEF message includes an unsecured first set of records spanning from a signature RTD preceding the place marker signature record to the place marker signature record.

4. The method of claim 1, wherein the set of records following the place marker signature record is secured by using a signature RTD that includes a valid signature.

5. The method of claim 4, further comprising deleting unsecured records in the NDEF message without changing the signature in the signature RTD that includes the valid signature.

6. The method of claim 4, further comprising modifying unsecured records in the NDEF message, without changing the signature in the signature RTD that includes the valid signature.

7. The method of in claim 4, further comprising adding unsecured records in the NDEF message, without changing the signature in the signature RTD that includes the valid signature.

8. The method of claim 1, wherein the predefined value is reserved for indicating a predefined signature type other than a place maker signature record.

9. The method of claim 1, wherein the predefined value is '0'.

10. A Near Field Communication (NFC) device for selectively securing records in a Near Field Communication Data Exchange Format (NDEF) message, the NFC device comprising:
a controller for generating a place marker signature record that a first set of records preceding the place marker signature record in the NDEF message is unsecured and a second set of records following the place marker signature record is secured, the place marker signature record being generated in a form of a signature Record Type Definition (RTD) by setting a URI_present field of the signature RTD to '0' and setting a signature_type field to a predefined value, wherein a combination of the URI_present field set to '0' and the signature_type field set to the predefined value indicates that the signature Record Type Definition (RTD) is a place marker signature record, and placing the place marker signature record in the NDEF message; and
a transmitter for transmitting the NDEF message.

11. The device of claim 10, wherein the NDEF message includes an unsecured first set of records spanning from a beginning of the NDEF message to the place marker signature record.

12. The device of claim 10, wherein the NDEF message includes an unsecured first set of records spanning from a signature RTD preceding the place marker signature record to the place marker signature record.

13. The device of claim 10, wherein the set of records following the place marker signature record is secured by using a signature RTD that includes a valid signature.

14. The device of claim 13, further comprising deleting unsecured records in the NDEF message without changing the signature in the signature RTD that includes the valid signature.

15. The device of claim 13, further comprising modifying unsecured records in the NDEF message, without changing the signature in the signature RTD that includes the valid signature.

16. The device of in claim 13, further comprising adding unsecured records in the NDEF message, without changing the signature in the signature RTD that includes the valid signature.

17. The device of claim 10, wherein the predefined value is reserved for indicating a predefined signature type other than a place maker signature record.

18. The device of claim 10, wherein the predefined value is '0'.

* * * * *